United States Patent [19]

Salters et al.

[11] 3,930,239

[45] Dec. 30, 1975

[54] INTEGRATED MEMORY

[75] Inventors: Roelof Herman Willem Salters; Lieuwe Boonstra; Cornelis Willem Lambrechtse, all of Eindhoven, Netherlands

[73] Assignee: U.S. Philips Corporation, New York, N.Y.

[22] Filed: July 5, 1974

[21] Appl. No.: 486,222

[30] Foreign Application Priority Data

July 11, 1973 Netherlands ........................ 7309642

[52] U.S. Cl. .............................. 340/173 R; 307/238

[51] Int. Cl.$^2$ ........................ G11C 7/00; G11C 8/00

[58] Field of Search ...... 340/173 R; 307/238, 221 R

[56] References Cited

UNITED STATES PATENTS

| | | | |
|---|---|---|---|
| 3,504,352 | 3/1970 | Stromswold et al. ............ | 340/173 R |
| 3,681,763 | 8/1972 | Meade et al. .................. | 340/173 R |
| 3,771,145 | 11/1973 | Wiener ........................ | 340/173 R |
| 3,778,784 | 12/1973 | Karp et al. ................... | 340/173 R |

*Primary Examiner*—Stuart N. Hecker

*Attorney, Agent, or Firm*—Frank R. Trifari; Daniel R. McGlynn

[57] ABSTRACT

Integrated solid-state memory in the form of an array, including row selection members, matching amplifiers and bit selection members which are fabricated on the same integrated circuit. The bit selection members include a shift register which, under the control of a selection instruction and a clock signal, sequentially selects a sequence of at least one bit location within a selected array row, the first bit location of the sequence being adapted to be set at random.

5 Claims, 2 Drawing Figures

INTEGRATED MEMORY

The invention relates to an integrated solid-state memory in the form of an array, which memory also includes row selection members for selecting a row of the array under the control of a first selection instruction signal and for each column a matching amplifier and a switch element which are connected between the memory array and an information transfer line, and bit selection members for selecting a bit location within an array row under the control of a second selection instruction signal. Such solid-state memories are known in different designs. At each selection operation a bit is read out. If a memory word comprises a plurality of bits, an equal number of memory arrays may be provided. During read-out first the information of an array row is selected and this information appears at the outputs of the matching amplifiers, which in this case are read amplifiers. Thus the information from one of the read amplifiers can be selected by the bit selection members and applied to an output. The reverse takes place when a bit of information is written in. Such a design operates satisfactorily. When a plurality of bits are to be read out every time a new memory cycle is required, which takes much time. In order to improve this aspect the invention is characterized in that the said bit selection members include a shift register which is fabricated in integrated-circuit form together with the solid-state memory and is connected between the switch elements and the bit selection members and can be set by the second selection instruction signal to a bit address determined by this signal. A sequence of output signals from the shift register is activated under co-control of a clock signal so that a corresponding sequence of the switch elements may be sequentially activated for selecting a sequence of bit locations within an array row. Although it is known to connect a shift register to the outputs of an array memory the use of an integrated one was not known. In the prior art, although information is stored in parallel in the shift register by the matching amplifiers and then serially applied to an output so that the bit selection members are dispensed with, or alternatively state 1 all bit positions are selected. The present invention does not relate to this prior-art arrangement at all. According to the present invention the shift register is connected between the bit selection members and the switch elements, the latter being sequentially and selectively activated by output signals from the shift register. Thus the bit location which is the first to be selected can be chosen at random. Furthermore a plurality of bit locations can be selected in rapid succession without the first selection instruction signals having to be repeated each time. Thus the accessibility of the bit locations is improved. Recently a shift register of particular suitability for the said purpose was developed. In this shift register the dissipation of energy is sufficiently reduced to enable it to be integrated together with the memory array. Prior-art shift registers either could not be employed in this form or were not fast enough. As is known, for many electronic circuits the product of dissipation and speed is approximately constant. According to the invention all the said elements of the solid-state memory can be jointly fabricated in integrated-circuit form, resulting in a highly compact, fast and flexible storage elements. Known memories so far were less advanced in one or more of said properties.

Advantageously the clock signal can be inhibited, in which case the said sequence comprises a single bit location. Thus another application of the memory according to the invention is realized.

Advantageously the said shift register is looped around after the manner of a ring counter. Thus if, for example, all the information bits of a bit row are transferred, any bit may be selected as the first. Hence other forms of cyclic reorganization also are possible. Furthermore a bit row can simply be read out twice or more times in that the shift register completes a corresponding number of cycles.

Advantageously the row selection members and the bit selection members are provided with common instruction signal input terminals at which the said first and second selection instruction signals can be sequentially received and under the control of a further instruction signal exert an activating effect on one of the two selection members only. Activating the selection members by such an additional instruction signal is known. However, receiving the selection instruction signals sequentially at the common instruction signal input terminals reduces the number of terminals required, which is of great advantage in integrated circuits. In conjunction with the other aspects of the invention a highly flexible selection is obtained in this manner while owing to the small number of terminals the cost of the memory and the number of manufacturing deficiencies are reduced.

An embodiment of the invention will now be described, by way of example, with reference to the accompanying diagrammatic drawings, in which.

Figure 1:
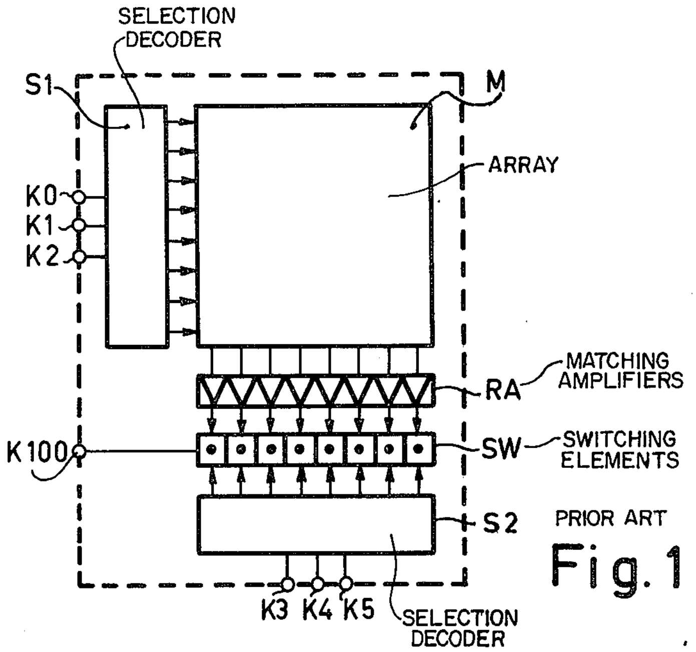
FIG. 1 shows a known integrated solid-state memory.

FIG. 1 shows a known solid-state memory which comprises an array M, a row selection decoder S1, a bit selection decoder S2, matching amplifiers RA, switch elements SW, selection terminals K0 . . K5 and an information terminal K100. In this simple example it is assumed that that the array M comprises 64 bits, while furthermore read-out only will be considered. If a bit is to be read out, there are applied to terminals K0 . . . K2 first selection instruction signals which, for example, indicate in a binary code the row number of the relevant information bit. From these signals the row selection decoder S1 forms a one-out-of-eight code by which a row is selected, the information stored in this row appearing at the inputs of the matching amplifiers RA, which act as read amplifiers. The row selection decoder may receive an additional signal, for example a clock signal, however, this is omitted for simplicity. It takes some time before the information is available at the outputs of the matching amplifiers RA, for example due to the fact that the output capacitances thereof have to be charged or discharged. Furthermore there are applied to the terminals K3 . . . K5 second selection instruction signals which, for example, indicate in a binary code the bit number of the required information bit. From these signals the bit selection decoder S2 forms a one-out-of-eight code by which one of the switch elements SW is selected and the associated matching amplifier is connected to the information terminal K100. Thus the information bit is available. Such a memory is described, for example, in "Digest of Technical Papers" of the "International Solid State Circuit Conference", Philadelphia 1973, page 26. In the memory described the duration of a memory cycle is 450 ns, the terminals K0 . . . K2 receiving the row adress during the period from 0 to 150 ns and the terminals K3 . . . K5 receiving the bit adress in the period from 225 to 300 ns. The last 150 ns of a memory cycle are available to the user. Each information bit requires 450 ns. A similar selection can be used during writing. This is not shown for simplicity.

Figure 2:
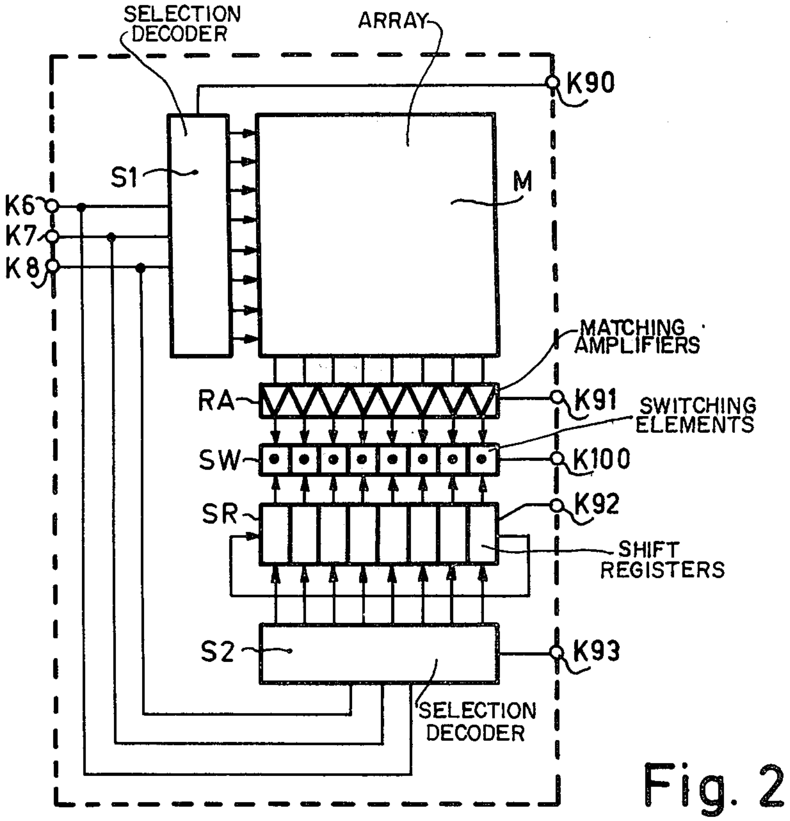
FIG. 2 shows an integrated solid-state memory according to the invention.

FIG. 2 shows an integrated solid-state memory according to the invention. In addition to the elements shown in FIG. 1 it comprises a shift-register SR, selection terminals K6 . . . K8 and control terminals K90, K91, K92, K93. All the elements shown inside the broken-line box form part of an electronic circuit integrated on a semiconductor wafer. The array M, the shift register SR and the matching amplifiers RA were recently described; the remaining elements are in general use. The invention is distinguished by a highly advantageous structural combination.

When an information bit is to be read out, first selection instruction signals are applied to the terminals K6 . . . K8. Thence they reach the row selection decoder S1 and the bit selection decoder S2. To the terminal K90 is applied a further control instruction signal by which the row selection decoder is activated but the bit selection decoder is not. Similarly to what has been described with reference to FIG. 1, the information from the selected array row is available at the outputs of the matching amplifiers RA after some time.

The second selection instruction signals are applied to the terminals K6 . . . K8 and a further control instruction signal is applied to the terminal K93. As a result, the bit selection decoder S2 is activated but the row selection decoder S1 is not. Here also, the decoder S2 forms a one-out-of-eight code which under the control of a clock signal applied to the control terminal K92 is stored in the shift register SR; the output signals from this register always activate one of the switch elements SW, the information at the output of the corresponding matching amplifier (RA) appearing at the information terminal K100. Then a new memory cycle can start. If, however, subsequently another clock signal is applied to the terminal K92, the shift register SR is advanced one position, causing the next one-out-of-eight code to be formed. As a result the next information bit from the selected bit row appears at the information terminal K100. The initial condition of the shift register SR depends only upon the selection instruction signals processed by the bit selection decoder S2. If the bit adresses are numbered from 0 to 7, possible readout sequences are:

0 1 2 3 4 5 6 7,
4 5 6 7 0 1 2 3,
2 3 4 5,
6 7 0 1.

If required, a shift register adapted to be shifted in two directions may be used. At each clock pulse an information bit appears at the terminal K100.

The matching amplifiers RA may, for example, be used both for reading and for writing. When writing, the selection is correspondingly effected. This may require the application of a discriminating signal to the terminal K91 or to another control terminal, not shown, for the matching amplifiers RA. Possibly the information is to be stored in a buffer store, but in a known arrangement for matching amplifiers this is not necessary. The information bits are required to appear at the terminal K100 (or at a special information supply terminal, not shown) in synchronism with the application of the clock pulses to the shift register SR. The read and write channels may be separate, each having matching amplifiers, switch elements, a shift register and a bit selection decoder. In this case read and write operations may be performed overlappingly.

In many cases the memory words are used in blocks of successive word sequences, for example, for updating files. Another possibility is to include a second memory which is faster, smaller and more expensive. In this case the integrated solid-state memory according to the invention is used as a backing store. If the memory according to the invention contains, for example, 4,096 words at 72 bits each, the high-speed store may contain 256 words of 72 bits each. Each word may be the information from four array rows per array. Thus first the desired information is demanded from the high-speed memory and if it is not contained therein it is demanded from the memory according to the invention and stored as the first information in the high speed store and/or used. The information from the same array row may successively be stored in successive locations of the high-speed memory. Such a configuration is known.

The abovementioned shift register may have a frequency of $10^7$ bits/second. With a word length of 64 bits and a memory cycle of 450 ns for array store, the first bit is available after 450 ns and the last one after 63 times 100 ns + 450 ns = 6.750 ns.

If according to known technology a new memory cycle is to be started each time, the first bit will be available after 450 ns and the last one after 64 times 450 ns = 28,800 ns.

If according to another method first all the information is stored in an external shift register and from this is serially transferred at a rate of $10^7$ bits/second, the bit desired as the first will be available at the earliest at 450 ns (if it is in front) and at the latest after 6,750 ns (if it is rear most). The transfer time for all bits again is 6,750 ns. Thus according to the invention the transfer time for an entire block is not long. In addition, any single information bit is available after a single memory cycle of 450 ns.

The above numbers are given by way of example. The shift register described may alternatively operate at $4.10^7$ bits/second. The length of the memory cycle also may be different. If the number of information bits in an array is 4,096 (4k bits), for each selection twice six instruction signal input terminals are required. Furthermore different types of control are possible; the further instruction signals for the row of bit selection decoders may alternatively derived from the shift register SR. Also, other combinations of the terminals K90 . . . K93 are possible.

The terminals which compared with known memories are released from duty may be used to accommodate a larger memory within the same envelope. Thus owing to the use of the shift register, selection need not take an excessive amount of time. On the other hand, for the same number of bits a smaller envelope provided with a smaller number of connecting pins may be used. The above properties may be utilized, in conjunction with the shift register SR, to provide a write-read possibility of still higher speed, for example by dividing the shift registers SR into portions each having its own output pen. Read-out will then be in parallel. The latter faculty also may be combined with the abovementioned simultaneous read-out and write-in.

What is claimed is:

1. An integrated solid-state memory, comprising a memory array for storing information in memory locations defined by rows and columns;

row selection members for selecting a row of said array under control of a first selection instruction signal;

a matching amplifier operatively associated with each of said columns;

switching means for outputting selected information to an information transfer line;

bit selection means, comprising bit selection members for selecting a bit location within an array row under control of a second selection instruction signal, and a shift register connected between said switching means and said bit selection members, said shift register being settable by said second selection instruction signal to a predetermined bit address; and instruction signal input terminals for supplying to both said row selection members and said bit selection members said first and second selection instruction signals.

2. A memory as defined in claim 1, wherein said first and second selection instruction signals are consecutively applied to said instruction signal input terminals.

3. A memory as defined in claim 1, wherein said shift register is an integrated circuit fabricated together with the memory.

4. A memory as defined in claim 1, further comprising means for applying a clock signal to said shift register for activating said switching means for selecting a sequence of bit locations within an array row.

5. A memory as defined in claim 1, further comprising means for applying a control signal to said bit selection members for activating said bit selection members after said row selection members have been activated.

* * * * *

UNITED STATES PATENT AND TRADEMARK OFFICE

CERTIFICATE OF CORRECTION

PATENT NO. : 3,930,239

DATED : December 30, 1975

INVENTOR(S) : ROELOF HERMAN WILLEM SALTERS ET AL

It is certified that error appears in the above-identified patent and that said Letters Patent are hereby corrected as shown below:

Column 1, line 40, after "the" insert --discrete--

Column 4, line 14, change "at" to --of--, line 27, after "for" add --the--, line 29, change "6.750" to --6,750--.

Signed and Sealed this eighth Day of June 1976

[SEAL]

*Attest:*

RUTH C. MASON
*Attesting Officer*

C. MARSHALL DANN
*Commissioner of Patents and Trademarks*